United States Patent
Son et al.

(10) Patent No.: US 6,218,008 B1
(45) Date of Patent: Apr. 17, 2001

(54) EASY DYEABLE POLYESTER FIBER

(75) Inventors: Yang-kuk Son; Hyoung-Jao Lee; Jung-Min Kim, all of Kyunggi-do (KR)

(73) Assignee: Hyosung Corporation, Seoul (KR)

( * ) Notice: Subject to any disclaimer, the term of this patent is extended or adjusted under 35 U.S.C. 154(b) by 0 days.

(21) Appl. No.: 09/660,520

(22) Filed: Sep. 12, 2000

(30) Foreign Application Priority Data

Jul. 21, 2000 (KR) .................................................. 00-42100

(51) Int. Cl.[7] .............................. D02G 3/00; C08F 20/00
(52) U.S. Cl. .......................... 428/364; 528/272; 528/302; 528/308; 528/308.6; 525/437; 525/444; 428/373
(58) Field of Search ..................................... 528/272, 302, 528/308, 308.6; 525/437, 444; 428/364, 373

(56) References Cited

U.S. PATENT DOCUMENTS

| 3,901,853 | * | 8/1975 | Tanikella . |
| 3,910,860 | * | 10/1975 | Tanikella . |
| 4,134,882 | * | 1/1979 | Frankfort et al. ..................... 528/309 |
| 5,958,548 | * | 9/1999 | Negola et al. .......................... 428/92 |
| 6,139,954 | * | 10/2000 | Dean et al. ........................... 428/373 |

* cited by examiner

Primary Examiner—Samuel A. Acquah
(74) Attorney, Agent, or Firm—Schmeiser, Olsen & Watts

(57) ABSTRACT

Disclosed is an easy dyeable polyester fiber. Consisting of 60–95 mol % of polyethylene terephthalate and 5–40 mol % of polytrimethylene terephthalate, the polyester fiber of the present invention is prepared through copolymerization or through the ester interchange in such a way that it ranges, in melting point from 230° C. to 250° C., in birefringence from 100 to $190 \times 10^{-3}$, and in boil-water shrinkage, from 8 to 25. Using disperse dyes, the polyester fiber can be dyed in deep shades at as low as or lower than 100° C. under atmospheric pressure. Thus, the polyester fiber of the present invention is can be used in mixture with thermal resistance-insufficient fibers such as spandex without causing yellowing therein. Also, it does not allow spots in the dyeing to appear thereon upon after-treatment, and in addition shows good fastness to washing, water, sublimation and friction.

1 Claim, 1 Drawing Sheet

1

EASY DYEABLE POLYESTER FIBER

BACKGROUND OF THE INVENTION

1. Field of the Invention

The present invention relates to a polyester fiber which can be dyed dark with disperse dyes in a low temperature, atmospheric pressure dying machine at a temperature of not higher than 100° C. and is superior in dye fastness.

2. Description of the Prior Art

Polyester fibers, of which polyethylene terephthalate is representative, are widely used in clothing because of their excellent physical and chemical properties and thermal resistance. At present, however, polyester fibers dyeing can be performed only at high temperatures under high pressures because of their chemical structure, in which the radicals capable of reacting with dyes are absent; and of their dense physical structure which is too dense to allow disperse dyes to penetrate into the polyester fibers.

Typically, polyester fibers are dyed at as high as 130° C. and thus, are limited in being mixed with thermal resistance-insufficient fibers such as spandex or natural fibers. As a result, polyester fibers are restricted to various uses and products.

Reduction of the dyeable temperature to 100° C. or less enables polyester fibers to be used in mixture with spandex or natural fibers, to be dyed with dyes of low thermal resistance, such as reactive dyes, and thus to be mixed with various materials.

As for nylon fibers, they, even if dyeable at 100° C. or less, suffer from the problem of being apt to undergo yellowing by heat and UV light and even by washing.

In contrast, polyester fibers do not show yellowing, but require high temperatures and pressures and thus high costs for their dyeing. To overcome this problem, extensive attempts have been made to develop easy dyeable polyester fibers which can be dyed by use of a low temperature, atmospheric pressure dyeing machine. For example, the development of easy dyeable polyester fibers has been approached through high speed spinning techniques or copolymerization techniques. One of the high speed spinning techniques is disclosed in U.S. Pat. No. 4,134,882 in which polyester is spun at high speeds by use of a spinneret with capillary-dimensions that produce high shear as the molten polyester resin is extruded. Thus, an alternation is generated in the orientation and crystalline structure of their molecular chains, leading to a change in the morphology of the polyester fibers and thus an improvement in their dyeability. The polyester fibers prepared according to the reference patent are able to be dyed at low temperatures, but are problematic in that an expression of a deep color on them requires the use of a high pressure dyeing machine at temperatures as high as 100–120° C.

On the other hand, copolymerization techniques for improving the dyeability of polyester fibers have the advantages of being conducted without requiring new production facilities, and not being limited to polyester fiber processing. Available for the copolymerization techniques are lipid compounds such as hydrocarbons, aromatic hydrocarbons and polyesters, which have two functional groups, such as two hydroxy groups or two carboxylic groups (ester groups), through which a chain is introduced into the backbone of the polyester. Of such compounds, those which have hydrophilic functional groups can be grafted with the greatest ease. In this connection, some techniques are found in Japanese Pat. Appl'n No. Sho. 61-226510 (Japanese Pat. No. 63085111) and Japanese Pat. Laid-Open Publication No. Hei. 4-41730. The polyester fibers manufactured according to these reference patents can be dyed at atmospheric pressure, but suffer from disadvantages of restricting the available dyes because of their poor light fastness as compared with common polyester fibers; and being apt to be not dyed uniformly, but locally.

Recently, extensive research has been performed on polytrimethylene terephthalate fibers. Polytrimethylene terephthalate fibers are characterized in that their initial elastic modulus is by about 30 g/d lower than that of nylon 6 fibers; are dyeable at lower temperatures than are polyethylene terephthalate fibers; and are of excellent elastic recovery. Dyeable as it is, polytrimethylene terephthalate requires temperatures as high as or higher than 105° C. for the expression of dark colors thereon. Also, it is not reasonable to regard the dyeing of polytrimethylene terephthalate as atmospheric pressure dyeing.

In Japanese Pat. Laid-Open Publication No. Hei. 11-100722, there is an easy dyeable polyester fiber which is deeply dyeable at less than 100° C. with disperse dyes, and superior in color fastness, and allows spandex to be weaved in mixture without yellowing the spandex. However, since the polyester fiber consists of at least 90 mol % of polytrimethylene terephthalate units and 0–10 mol % of ester units, use of such a high content of expensive polytrimethylene terephthalate is economically unfavorable. In addition, the presence of as much as 90 mol % of polytrimethylene terephthalate decreases the melting point of the copolymer and forms spots in the dyeing on the filament upon after-treatment (e.g., dyeing).

SUMMARY OF THE INVENTION

Therefore, it is an object of the present invention to overcome the problems encountered in prior arts and to provide an easy dyeable polyester fiber which is able to express a broad spectrum of colors from a light color to a deep color at low temperatures thereon, in addition to being superior in color fastness, and with a melting point in the range of 230–250° C. The polyester fiber can be more easily dyed in various color concentrations at as low as or lower than 100° C. with disperse dyes than can the conventional polyethylene terephthalate fibers spun at high speeds. In addition, the excellent thermal stability attributable to the high melting point prevents the polyester fiber from being deformed upon after-treatments. Comprising polytrimethylene terephthalate at an amount of 5–40 mol %, the polyester fiber is economically more favorable than is the conventional polyester fiber composed of 90 mol % or greater of polytrimethylene terephthalate.

Based on the present invention, the above object could be accomplished by provision of an easy dyeable polyester fiber, which is composed of 60–95 mol % of a polyethylene terephthalate moiety and 5–40 mol % of a polytrimethylene terephthalate moiety, satisfying the following conditions:

$230°\ C. \leq Tm \leq 250°\ C.$ $100 \leq \Delta n \times 10^3 \leq 190$ $8 \leq B.W.S. \leq 25$ wherein, Tm stands for melting point, $\Delta n$ for birefringence, and B. W. S for boil-water shrinkage.

Figure 1:
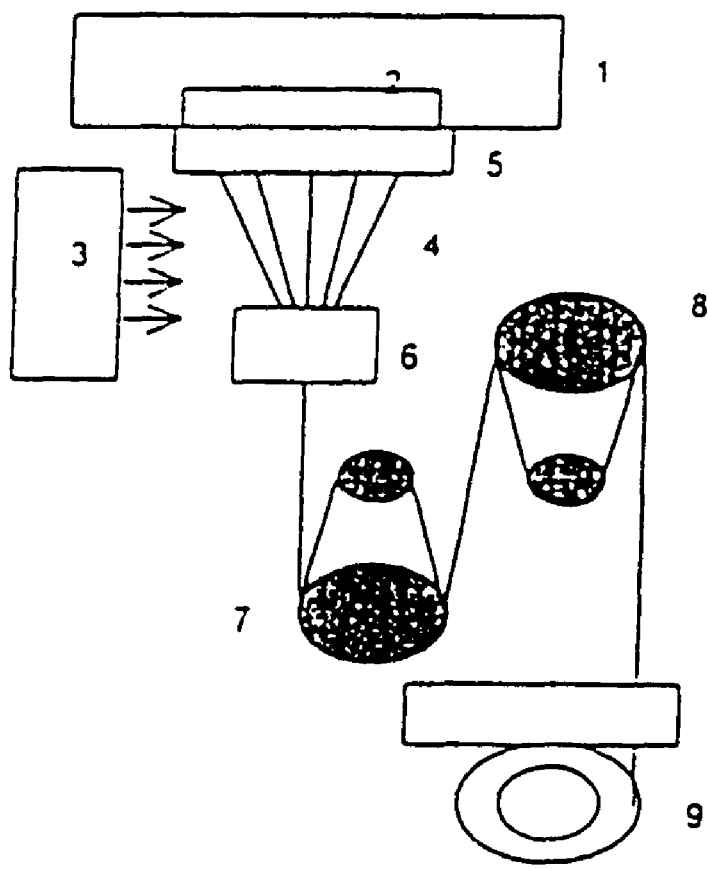
FIG. 1 is a schematic view showing a process for preparing the easy dyeable polyester fiber in accordance with the present invention.

<Description of Reference Numerals of the Drawing>

1: spinning beam
2: spinneret
3: quenching air
4: yarn
5: quench-delayed zone
6: oiled nozzle
7: drawing roller
8: setting roller
9: winder

DETAILED DESCRIPTION OF THE INVENTION

The present invention contemplates an easy dyeable polyester fiber consisting of 60–95 mol % of a polyethylene terephthalate moiety and 5–40 mol % of polytrimethylene terephthalate. When the polytrimethylene terephthalate content exceeds 40 mol %, the polyester fiber has such a low melting temperature that the polyester fiber is difficult to handle in after-treatment processes. In this case, therefore, the polyester fiber cannot be used in practice. On the other hand, when the polytrimethylene terephthalate content is below 5 mol %, the polyester fiber is so poor in easy dyeability that dyeing cannot be achieved at atmospheric pressure.

The easy dyeable polyester fiber of the present invention preferably ranges, in melting point, from 230 to 250° C. as measured by DSC. For example, if the melting temperature is below 230° C., the polyester fiber is unstable in after-treatment processes which are typically conducted at 180–210° C. On the other hand, a melting point greater than 250° C. does not cause any problem, but cannot be obtained if the polytrimethylene terephthalate content is below 40 mol %.

Preferable birefringence of the easy dyeable polyester fiber of the present invention fall in the range of $100 \times 10^{-3}$ to $190 \times 10^{-3}$. For example, a polyester fiber with a birefringence of lower than $100 \times 10^{-3}$ is so unstable in after-treatment processes as not to be usable in practice. On the other hand, a polyester fiber with a birefringence of higher than $190 \times 10^{-3}$ is not dyeable at atmospheric pressure.

In accordance with the present invention, a boil-water shrinkage of 8–25% is given to the polyester fiber to improve its processability and dyeing properties. For example, when showing a boil-water shrinkage of greater than 25%, the polyester fiber is unstable in after-treatment processes. On the other hand, dyeing cannot be achieved on the polyester fiber with a boil-water shrinkage of less than 8% at atmospheric pressure.

Polytrimethylene terephthalate-grafted polyethylene terephthalate, which is useful in the present invention, can be prepared by copolymerizing terephthalic acid, ethylene glycol and 1,3-propanediol or by subjecting a molten mixture of polyethylene terephthalate and polytrimethylene terephthalate to ester interchange. Well-known techniques may be used for the drying and melt-spinning of the resin.

With reference to FIG. 1, there is shown a process flow for the spinning of an easy dyeable polyester fiber, which is similar to that for common polyester fibers. The preparation of an easy dyeable polyester fiber can be achieved by a one-step process (spin-draw) or by a two-step process (POY-D/T or POY-DTY). That is, the easy dyeable polyester fiber of the present invention can be produced in an ordinary process, without high speed spinning, and enjoys the advantage of requiring no separate special facilities.

When being dyed at 100° C. in an atmospheric dyeing machine, the easy dyeable polyester fiber of the present invention shows color depth with a K/S value amounting to 20 or greater, which is in the same range as those obtained with ordinary polyester fibers when the dying is carried out at 130° C. under high pressures, and cannot be obtained unless an ordinary adsorption rate exceeds at least 70%.

A better understanding of the present invention may be obtained in light of the following examples which are set forth to illustrate, but are not to be construed to limit the present invention.

In connection with the color fastness, an examination was made of their fastness to washing, water, sublimation, and friction. The easy dyeable polyester fibers prepared according to the present invention were measure to be fourth degree or higher in all of the fastness tests.

In the following examples, polyester fibers were assayed for bathochromaticity and color fastness as follows.

Test

Color Depth

After measuring the spectral reflectivity R of a dyed sample cloth, its K/S value, which represents the Color Depth, was calculated in accordance with the following Kubelka-Munk equation.

$$K/S = (1-R)^2/2R \quad (R: \text{maximal absorption wavelength of dye})$$

Color Fastness

Color Fastness was measured in accordance with the Korean Industrial Standards: washing fastness was referred to KS K 0430, water fastness to KS K 0645, sublimation fastness to KS K 0651, friction sublimation to KS K 0650, and light fastness to KS K 0218.

EXAMPLE I

From a copolymer consisting of 60 mol % of a polyethylene terephthalate moiety and 40 mol % of a polytrimethylene terephthalate moiety, a fiber was prepared to 75 deniers/36 filaments through a spin draw process in which the yarns were spun at a spinning speed of 5,000 m/min, passing a quenching air flux with a wind speed of 0.4 m/sec and oiled at an amount of 0.8 wt %.

After being sized, the yarns were weaved into a fabric with a warp density of 120 numbers/inch and a weft density of 80 numbers/inch, subjected to scouring shrinkage at 110° C. for 20 min and thermally set at 180° C. for 30 sec. Thereafter, the fabric was dyed with kayalonpolyester Blue-2R SF at an o.w.f of 6% with a bath ratio of 1:50 in the presence of a dispersing agent at 0.5 g/l and acetic acid at 0.25 ml/l under temperature conditions in which the temperature was elevated at a rate of 1° C./min from 40° C. to 98° C., maintained at the highest point, and lowered therefrom to 40° C. at a rate of 1° C./min. The cloth sample thus obtained was measured for color depth and color fastness.

EXAMPLE II

From a copolymer consisting of 70 mol % of a polyethylene terephthalate moiety and 30 mol % of a polytrimethylene terephthalate moiety, a fiber was prepared to 75 deniers/36 filaments through a spin draw process in which the yarns were spun at a spinning speed of 5,000 m/min, passing a quenching air flux with a wind speed of 0.4 m/sec and oiled at an amount of 0.8 wt %.

A dyed sample was obtained and tested for color depth and color fastness in the same manner as in Example I.

EXAMPLE III

From a copolymer consisting of 80 mol % of a polyethylene terephthalate moiety and 20 mol % of a polytrimethylene terephthalate moiety, a fiber was prepared to 75 deniers/36 filaments through a spin draw process in which the yarns were spun at a spinning speed of 5,000 m/min, passing a quenching air flux with a wind speed of 0.4 m/sec and oiled at an amount of 0.8 wt %.

A dyed sample was obtained and tested for color depth and color fastness in the same manner as in Example I.

EXAMPLE IV

From a copolymer consisting of 90 mol % of a polyethylene terephthalate moiety and 10 mol % of a polytrimethylene terephthalate moiety, a fiber was prepared to 75 deniers/36 filaments through a spin draw process in which the yarns were spun at a spinning speed of 5,000 m/min, passing a quenching air flux with a wind speed of 0.4 m/sec and oiled at an amount of 0.8 wt %.

A dyed sample was obtained and tested for color depth and color fastness in the same manner as in Example I.

EXAMPLE V

From a copolymer consisting of 70 mol % of a polyethylene terephthalate moiety and 30 mol % of a polytrimethylene terephthalate moiety, a fiber was prepared to 50 deniers/144 filaments through a POY-D/T process in which the yarns were spun at a spinning speed of 2,500 m/min, passing a quenching air flux with a wind speed of 0.4 m/sec and oiled at an amount of 0.8 wt %.

A dyed sample was obtained and tested for color depth and color fastness in the same manner as in Example I.

EXAMPLE VI

A copolymer consisting of 70 mol % of a polyethylene terephthalate moiety and 30 mol % of a polytrimethylene terephthalate moiety and an easy dyeable polyester were prepared into a conjugated fiber of 50 deniers/72 filaments by a POY-D/T process in which the yarns were spun at a spinning speed of 2,800 m/min, passing a quenching air flux with a wind speed of 0.4 m/sec and oiled at an amount of 0.8 wt %. In the conjugated fiber, the island component, consisting of polyethylene terephthalate and polytrimethylene terephthalate, amounts to 70 % while the sea component, consisting of the easy dyeable polyester, amounts to 30 %. Each filament comprised 37 islands.

After being sized, the filaments were weaved into a fabric with a warp density of 120 numbers/inch and a weft density of 80 numbers/inch, subjected to scouring shrinkage at 110° C. for 20 min and thermally set at 180° C. for 30 sec. Then, the fabric was subjected to a weight loss process in an aqueous 2% sodium hydroxide solution at 98° C. for 20 min, followed by a dyeing process. In this regard, the fabric was dyed with kayalonpolyester Blue-2R SF at an o. w. f of 6% with a bath ratio of 1:50 in the presence of a dispersing agent at 0.5 g/l and acetic acid at 0.25 ml/l under the temperature conditions in which the temperature was elevated at a rate of 1° C./min from 40° C. to 98° C., maintained at the highest point, and lowered therefrom to 40° C. at a rate of 1° C./min. The cloth sample thus obtained was measured for bathochromaticity and color fastness.

EXAMPLE VII

From a copolymer consisting of 70 mol % of a polyethylene terephthalate moiety and 30 mol % of a polytrimethylene terephthalate moiety, a monofilament of 75 deniers was prepared through a spin draw process in which the yarns were spun at a spinning speed of 5,500 m/min, passing a quenching air flux with a wind speed of 1.2 m/sec and oiled at an amount of 0.3 wt %.

A dyed sample was obtained and tested for color depth and color fastness in the same manner as in Example I.

Comparative Example I

From a polymer consisting of 100 mol % of a polyethylene terephthalate moiety, a fiber was prepared into 75 deniers/36 filaments through a spin draw process in which the yarns were spun at a spinning speed of 5,000 m/min, passing a quenching air flux with a wind speed of 0.4 m/sec and oiled at an amount of 0.8 wt %.

A dyed sample was obtained and tested for color depth and color fastness in the same manner as in Example I.

Comparative Example II

From a copolymer consisting of 10 mol % of a polyethylene terephthalate moiety and 90 mol % of a polytrimethylene terephthalate moiety, a fiber was prepared into 75 deniers/36 filaments through a spin draw process in which the yarns were spun at a spinning speed of 5,000 m/min, passing a quenching air flux with a wind speed of 0.4 m/sec and oiled at an amount of 0.8 wt %.

A dyed sample was obtained and tested for color depth and color fastness in the same manner as in Example I.

Comparative Example III

From a copolymer consisting of 20 mol % of a polyethylene terephthalate moiety and 80 mol % of a polytrimethylene terephthalate moiety, a fiber was prepared into 75 deniers/36 filaments through a spin draw process in which the yarns were spun at a spinning speed of 5,000 m/min, passing a quenching air flux with a wind speed of 0.4 m/sec and oiled at an amount of 0.8 wt %.

A dyed sample was obtained and tested for color depth and color fastness in the same manner as in Example I.

Comparative Example IV

From a copolymer consisting of 40 mol % of a polyethylene terephthalate moiety and 60 mol % of a polytrimethylene terephthalate moiety, a fiber was prepared into 75 deniers/36 filaments through a spin draw process in which the yarns were spun at a spinning speed of 5,000 m/min, passing a quenching air flux with a wind speed of 0.4 m/sec and oiled at an amount of 0.8 wt %.

A dyed sample was obtained and tested for color depth and color fastness in the same manner as in Example I.

Comparative Example V

From a copolymer consisting of 20 mol % of a polyethylene terephthalate moiety and 80 mol % of a polytrimethylene terephthalate moiety, a fiber was prepared into 50 deniers/144 filaments through a POY-D/T process in which the yarns were spun at a spinning speed of 2,500 m/min, passing a quenching air flux with a wind speed of 0.4 m/sec and oiled at an amount of 0.8 wt %.

A dyed sample was obtained and tested for color depth and color fastness in the same manner as in Example I.

The color depth and color fastness measurements of the fabrics obtained in above examples and comparative examples are given in Tables 1 and 2, below.

TABLE 1

| Properties | Nos. of Examples | | | | | | |
|---|---|---|---|---|---|---|---|
| | I | II | III | IV | V | VI | VII |
| PET Content (mol %) | 60 | 70 | 80 | 90 | 70 | 70 | 70 |
| PTT Content (mol %) | 40 | 30 | 20 | 10 | 30 | 30 | 30 |
| Fineness (Den) | 2.0 | 2.0 | 2.0 | 2.0 | 0.3 | 0.01 | 60 |
| Spinning Speed (m/min) | 5,000 | 5,000 | 5,000 | 5,000 | 2,500 | 2,800 | 5,500 |
| Δn (×10$^3$) | 232 | 240 | 245 | 248 | 240 | 240 | 240 |
| B.W.S (° C.) | 115 | 127 | 150 | 180 | 138 | 129 | 112 |
| Strength (g/d) | 24 | 21 | 17 | 14 | 18 | 19 | 15 |
| Elongation (%) | 3.9 | 4.1 | 4.4 | 4.8 | 4.0 | 3.5 | 4.5 |
| K/S | 35 | 35 | 35 | 35 | 40 | 38 | 41 |
| Washing Fastness (grade) | 22 | 22 | 21 | 20 | 21 | 20 | 20 |
| Water Fastness (grade) | 4–5 | 4–5 | 4–5 | 4–5 | 4–5 | 4–5 | 4–5 |
| Sublimation Fastness (grade) | 4–5 | 4–5 | 4–5 | 4–5 | 4–5 | 4–5 | 4–5 |
| Friction Fastness (grade) | 4–5 | 4–5 | 4–5 | 4–5 | 4–5 | 4–5 | 4–5 |
| Light Fastness (grade) | 4–5 | 4–5 | 4–5 | 4–5 | 4–5 | 4–5 | 4–5 |

TABLE 2

| Properties | Nos. of Comparative Examples | | | | |
|---|---|---|---|---|---|
| | I | II | III | IV | V |
| PET Content (mol %) | 100 | 10 | 20 | 40 | 20 |
| PTT Content (mol %) | 0 | 90 | 80 | 60 | 80 |
| Fineness (Den) | 2.0 | 2.0 | 2.0 | 2.0 | 0.3 |
| Spinning Speed (m/min) | 5,000 | 5,000 | 5,000 | 5,000 | 2,500 |
| Melting Point | 252 | 222 | 211 | 201 | 211 |
| Δn (×10$^3$) | 195 | 78 | 91 | 111 | 91 |
| B.W.S (° C.) | 8 | 21 | 25 | 30 | 23 |
| Strength (g/d) | 4.8 | 3.5 | 3.4 | 3.0 | 3.1 |
| Elongation (%) | 33 | 40 | 39 | 30 | 41 |
| K/S | 5 | 10 | 8 | 9 | 8 |
| Washing Fastness (grade) | 3–4 | 4 | 4 | 4 | 4 |
| Water Fastness (grade) | 3–4 | 4 | 4 | 4 | 4 |
| Sublimation Fastness (grade) | 3–4 | 4–5 | 4–5 | 4–5 | 4–5 |
| Friction Fastness (grade) | 4 | 4 | 4 | 4 | 4 |
| Light Fastness (grade) | 4 | 4–5 | 4–5 | 4–5 | 4–5 |

Consisting of 60–95 mol % of polyethylene terephthalate and 5–40 mol % of polytrimethylene terephthalate, the polyester fiber of the present invention is prepared through copolymerization from the constituent monomers or through the ester interchange in a molten mixture of the polymers, and can be dyed in a deep shade at as low as or lower than 100° C. under atmospheric pressure. Thus, the polyester fiber of the present invention is economically favorable in making dyed cloths since it does not require a high pressure dyeing machine for its dyeing. Over conventional easy dyeble polyester fibers, the polyester fiber of the present invention also has the economic advantage of being low in material cost because it contains a smaller amount of expensive polytrimethylene terephthalate. In addition, the low dyeing temperature enables the polyester fiber of the present invention to be used in mixture with thermal resistance-insufficient fibers such as spandex without causing yellowing therein.

With the ability to be mixed with other material fibers, therefore, the polyester fibers of the present invention can find numerous high quality applications in the fabric industry. Further, as shown in Tables 1 and 2, the polyester fibers of the present invention are higher in melting point than are the polyester fibers containing 90 mol % or greater of polytrimethylene terephthalate so that they do not allow spots in the dyeing to appear thereon upon after-treatment in addition to showing good fastness to washing, water, sublimation and friction.

The present invention has been described in an illustrative manner, and it is to be understood that the terminology used is intended to be in the nature of description rather than of limitation. Many modifications and variations of the present invention are possible in light of the above teachings. Therefore, it is to be understood that within the scope of the appended claims, the invention may be practiced otherwise than as specifically described.

What is claimed is:

1. An easy dyeable polyester fiber, which is composed of 60–95 mol % of a polyethylene terephthalate moiety and 5–40 mol % of a polytrimethylene terephthalate moiety, satisfying the following conditions:

230° C.≦Tm≦250° C.

100≦Δn×10$^3$≦190

8≦B. W. S.≦25 wherein, Tm stands for melting point, Δn for birefringence, and B. W. S for boil-water shrinkage.

* * * * *